United States Patent [19]
Choi

[11] Patent Number: 5,396,337
[45] Date of Patent: Mar. 7, 1995

[54] METHOD AND APPARATUS FOR EFFECTING CONSECUTIVE PROGRAM RECORDINGS WITH A VCR USING A PROGRAM END SIGNAL

[75] Inventor: Chang W. Choi, Seoul, Rep. of Korea

[73] Assignee: Goldstar Electron Co., Ltd., Choongchungbook, Rep. of Korea

[21] Appl. No.: 993,873

[22] Filed: Dec. 23, 1992

[30] Foreign Application Priority Data

Dec. 23, 1991 [KR] Rep. of Korea ............... 23986/1991

[51] Int. Cl.[6] ............................................. H04N 5/76
[52] U.S. Cl. ................................... 358/335; 360/72.2
[58] Field of Search ...................... 358/335, 310, 342; 360/69, 72.1, 72.2, 73.05, 73.06, 73.12, 73.13; H04N 5/76, 9/79, 5/78, 5/781

[56] References Cited

U.S. PATENT DOCUMENTS

| | | |
|---|---|---|
| 3,852,814 | 12/1974 | Johnson et al. . |
| 3,918,090 | 11/1975 | Ludwig et al. ............ 360/72.1 |
| 4,404,604 | 9/1983 | Ueki et al. ............ 360/72.1 |
| 4,636,878 | 1/1987 | Murayama ............ 360/72.1 |
| 4,639,793 | 1/1987 | Goldman . |
| 4,663,679 | 5/1987 | Sekiguchi et al. . |
| 4,691,251 | 9/1987 | Ookawa et al. ............ 360/14.1 |
| 4,750,051 | 6/1988 | Kaneko et al. ............ 358/330 |
| 4,811,127 | 3/1989 | Okauchi . |
| 4,979,046 | 12/1990 | Aki et al. ............ 358/330 |
| 5,130,811 | 7/1992 | Ganse ............ 358/330 |

FOREIGN PATENT DOCUMENTS

| | | |
|---|---|---|
| 2354367 | 5/1974 | Germany . |
| 2829920 | 1/1980 | Germany . |
| 3135397 | 6/1982 | Germany . |
| 3440174 | 5/1985 | Germany . |
| 3735539 | 5/1988 | Germany . |
| 3742469 | 5/1989 | Germany . |
| 3833452 | 4/1990 | Germany . |
| 3932696 | 4/1990 | Germany . |
| 2263153 | 9/1992 | Japan ........................... 360/72.1 |
| 2083681 | 3/1982 | United Kingdom ............ 360/72.1 |
| 377864 | 7/1973 | U.S.S.R. . |

Primary Examiner—Tommy P. Chin
Assistant Examiner—Thai Tran
Attorney, Agent, or Firm—Lowe, Price, LeBlanc & Becker

[57] ABSTRACT

Method and circuit for recording and detecting a program end signal which enable a new program to be recorded after the end of previously recorded program on a video tape by searching an end portion of the previous program. The circuit includes a consecutive recording switch for selecting a consecutive recording mode for searching for an end portion of a program which has been previously recorded on a tape and consecutively recording a program, a program end recording unit for outputting a control pulse at a reference duty cycle which is generated from a servo system, modulating the control pulse at a predetermined duty cycle when a stop signal, is inputted, while delaying a stop signal, outputting a predetermined number of control pulses for indicating an end of program, and thereafter outputting said stop signal, and a program end detecting unit for outputting a recording signal for operating the video cassette tape recorder in a recording mode when no control pulse is detected from the tape or after the program end indicating pulse is detected upon selection of the consecutive recording mode by the consecutive recording switch.

1 Claim, 7 Drawing Sheets

METHOD AND APPARATUS FOR EFFECTING CONSECUTIVE PROGRAM RECORDINGS WITH A VCR USING A PROGRAM END SIGNAL

BACKGROUND OF THE INVENTION

1. Field of the Invention

The present invention relates to a method and circuit for recording and detecting a program end signal for use in a video cassette tape recorder (VCR) which are capable of recording an end signal indicating an end of program and recording a new program after the previously recorded program by detecting the end signal when recording a new program.

2. Description of the Prior Art

In the conventional video cassette tape recorders, when a new program is to be recorded on a video tape in which other programs have been recorded, a user has to search for an end portion of the previously recorded program while reproducing the tape and then to record consecutively the new program after the previously recorded program while operating the VCR in a recording mode because there is no information indicating the end of program in the conventional recording system.

Accordingly, it is inconvenient to record two or more programs on the video tape.

Also, since the end of previously recorded program must be searched for by operating the VCR in a CUE mode, it takes a relatively long time in such a searching operation.

SUMMARY OF THE INVENTION

Accordingly, it is an object of the present invention to provide method and circuit for recording and detecting an end signal for use in a VCR which are capable of automatically detecting an end portion of previously recorded program and recording consecutively a new program after the end portion.

Another object of the present invention is to provide method and circuit for recording and detecting an end signal for use in a VCR which are capable of recording an information indicating an end of program when recording the program, automatically detecting the end information which has been previously recorded and consecutively recording a new program on the tape after the end portion of program.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

In accordance with one embodiment of the present invention, the recording and detecting method for program end signal comprising the steps of:

a) travelling a tape at a high speed in an advancing direction when a consecutive recording mode is selected;

b) discriminating as to whether a control pulse is detected in the tape travelling at high speed;

c) repeatedly executing said step b) until an end indicating control pulse is detected when the control pulse is detected at said step b);

d) repeatedly executing said steps b) and c), when the end indicating control pulse is detected at said step c), until the number of detecting the control pulse comes to a predetermined value;

e) executing a recording mode when the number of detecting the control pulse is over the predetermined value or when no control pulse is detected at said step b);

f) modulating a high potential duty cycle of the control pulse and recording the modulated pulse as a program end indicating control pulse when a stop signal is inputted during said recording mode; and g) repeatedly executing said step f) until the number of recording the program end indicating control pulse comes to a predetermined value and thereafter stopping the recording mode.

In accordance with another embodiment of the present invention, the circuit for recording a program end signal for use in a video cassette tape recorder, comprises a consecutive recording switch for selecting a consecutive recording mode for searching for an end portion of a program which has been previously recorded, on a tape and consecutively recording a program, a program end recording unit for outputting a control pulse at a reference duty cycle which is generated from a servo system, modulating the control pulse at a predetermined duty cycle when a stop signal is inputted, while delaying the stop signal, outputting a predetermined number of control pulses for indicating an end of program, and thereafter outputting said stop signal, and a program end detecting unit for outputting a recording signal for operating the video cassette tape recorder in a recording mode when no control pulse is detected from the tape or after the program end indicating pulse is detected upon selection of the consecutive recording mode by the consecutive recording switch.

The program end recording unit includes a selecting unit for selecting and outputting the external stop signal through different output terminals depending upon the selection of the consecutive recording switch, a control pulse recording unit for outputting a control pulse generated at a servo system as a control pulse having a predetermined high potential reference duty cycle, outputting a predetermined number of control pulses of which the duty cycle is modulated to a control head when the stop signal is inputted from said selecting unit, and thereafter outputting the stop signal, and an OR-gate for OR-ing the stop signal which is outputted from said selecting unit in a reproducing mode and the stop signal from the control pulse recording unit and outputting the OR-ed signal as a stop signal.

And, the program end detecting unit includes, an end indicating control pulse detecting unit for receiving the consecutive recording signal of the consecutive recording switch as an enable signal and detecting a program end indicating control pulse modulated at a predetermined duty cycle among the control pulses which are detected in the high speed advance travelling mode, a control pulse detecting unit for receiving the consecutive recording signal of the consecutive recording switch as an enable signal and detecting presence/absence of control pulses which are detected in the high speed advance travelling mode, and a recording signal controller for outputting a recording signal for operating the video cassette tape recorder in the recording mode when no control pulse signal is detected at the control pulse detecting unit or a program end indicating control pulse is detected at the end indicating control pulse detecting unit under the condition that the consecutive recording signal of the consecutive recording switch is applied, or when a normal recording signal is inputted.

In accordance with the present invention, when a user operates the VCR in a consecutive recording mode by pressing a consecutive recording switch, a control pulse detecting unit detects presence/absence of a control pulse while travelling the video tape at a high speed, and an end indicating control pulse detecting unit detects a control pulse for indicating an end.

In case that the tape is a unused tape or a program is not recorded at the portion that is currently secanned, no control pulse will be detected, so that the VCR is immediately operated in the recording mode. While in case that a program is recorded in the tape, control pulses will be detected and when an end indicating control pulse is detected among the control pulses, a recording signal is outputted.

When an external stop signal is inputted to the end indicating control pulse recording unit, the stop signal is delayed for a predetermined time and a high potential duty cycle of the control pulse is modulated during the delayed time so that the number of the control pulse is counted.

As a result, in case that a program is recorded on the video tape, a new program may be recorded just after the previously recorded program.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

Figure 1:
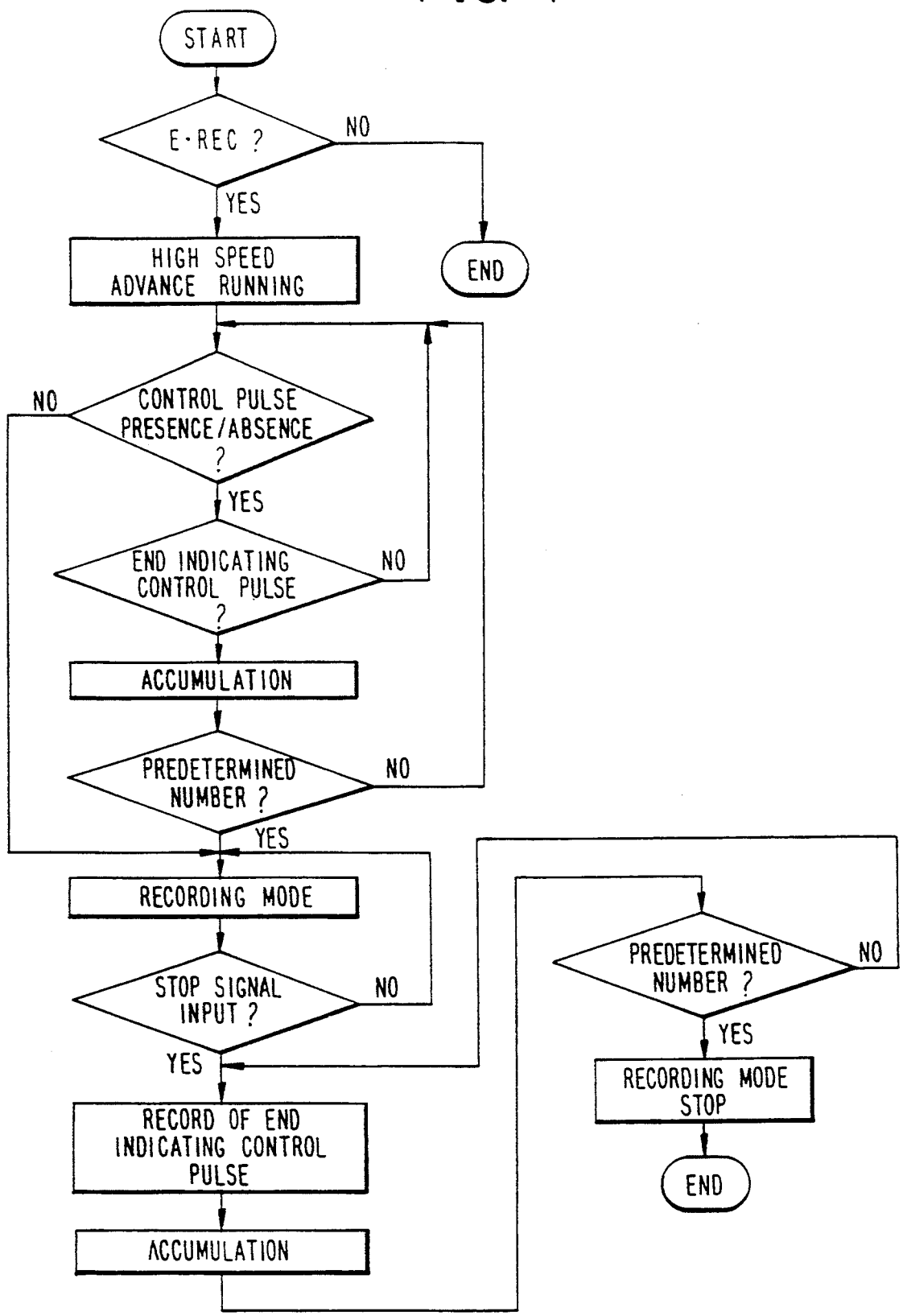
FIG. 1 is a flow-chart showing a recording and detecting method for a program end signal in a VCR according to the present invention.

Referring now in detail to the drawings for the purpose of illustrating preferred embodiments of the present invention, the method for recording and detecting a program end signal of an embodiment of the present invention as shown in FIG. 1 comprises the steps of:

a) travelling a tape at a high speed in an advancing direction when a consecutive recording mode is selected;

b) discriminating as to whether a control pulse is detected in the tape travelling at high speed;

c) repeatedly executing said step b) until an end indicating control pulse is detected when control pulses are detected at said step b);

d) repeatedly executing said steps b) and c), when the end indicating control pulse is detected at said step c), until the number of detecting the control pulse comes to a predetermined value;

e) executing a recording mode when the number of detecting the control pulse is over the predetermined value or when no control pulse is detected at said step b);

f) modulating a high potential duty ratio of the control pulse and recording the modulated pulse as a program end indicating control pulse when a stop signal is inputted during said recording mode; and g) repeatedly executing said step f) until the number of recording the program end indicating control pulse comes to a predetermined value and thereafter stopping the recording mode.

The recording and detecting method for a program end signal as above can be accomplished by providing a consecutive recording switch 100 to a conventional VCR and programming a main controller of a VCR such that the main controller consecutively executes the above steps as the consecutive recording switch 100 is turned on.

Otherwise, the method also may be executed by controlling a recording signal and a stop signal for operating a VCR in a recording mode by a circuit which will be described hereinafter, without programming the main controller.

Hereinafter, the circuit for recording and detecting a program end signal will be described.

Figure 2:
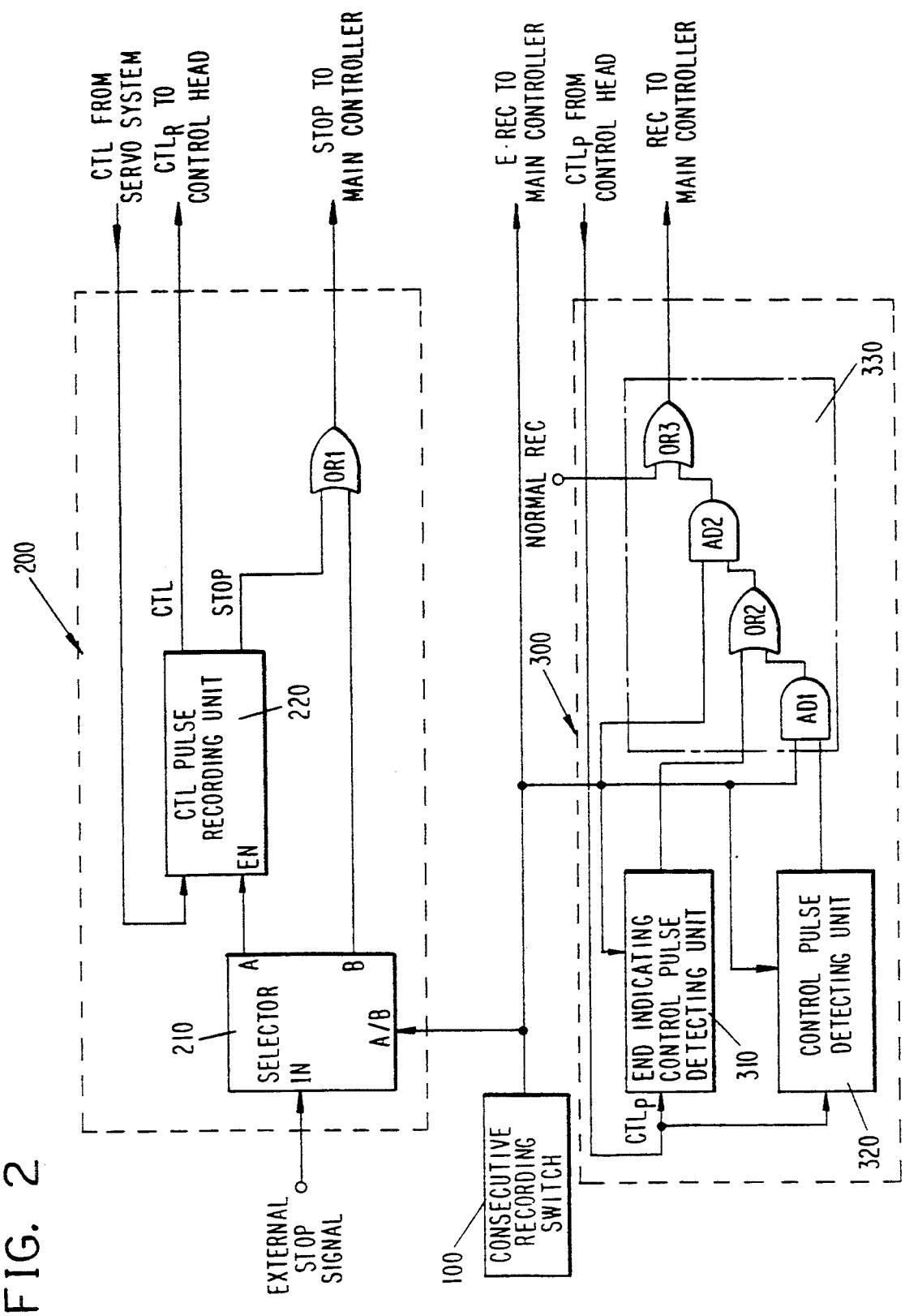
FIG. 2 is a block diagram showing the configuration of a circuit for recording and detecting a program end signal according to the present invention.

As shown in FIG. 2, the circuit comprises a consecutive recording switch 100 for selecting a consecutive recording mode for searching for an end portion of a program which has been previously recorded on a tape and consecutively recording a program, a program end recording unit 200 for outputting a control pulse CTL at a reference duty cycle (55-65%) which is generated from a servo system (not shown), modulating the control pulse at a predetermined duty cycle when a stop signal STOP is inputted, while delaying a stop signal for a predetermined time, outputting a predetermined number of control pulses CLT for indicating an end of program, and thereafter outputting said stop signal, and a program end detecting unit 300 for outputting a recording signal REC for operating the video cassette tape recorder in a recording mode when no control pulse CTLp is detected from the tape or after the program end indicating pulse is detected upon selection of the consecutive recording mode by the consecutive recording switch, The program end recording unit includes a selecting unit 210 for selecting and outputting the external stop signal STOP which is inputted from a remote controller or a manipulation switch through different output terminals A and B depending upon the selection of the consecutive recording switch 100, a control pulse recording unit 220 for outputting a control pulse generated at a servo system as a control pulse having a predetermined high potential reference duty cycle (55%-65%), outputting a control pulse of a predetermined number of which the duty cycle is modulated to a control head (not shown) when the stop signal STOP is inputted from said selecting unit 210, and thereafter outputting the stop signal STOP, and an OR-gate OR1 for OR-ing the stop signal STOP which is outputted from said selecting unit 210 in a reproducing mode and the stop signal STOP from the control pulse recording unit 220 and outputting the OR-ed signal as a stop signal to a main control circuit (not shown).

Figure 3:
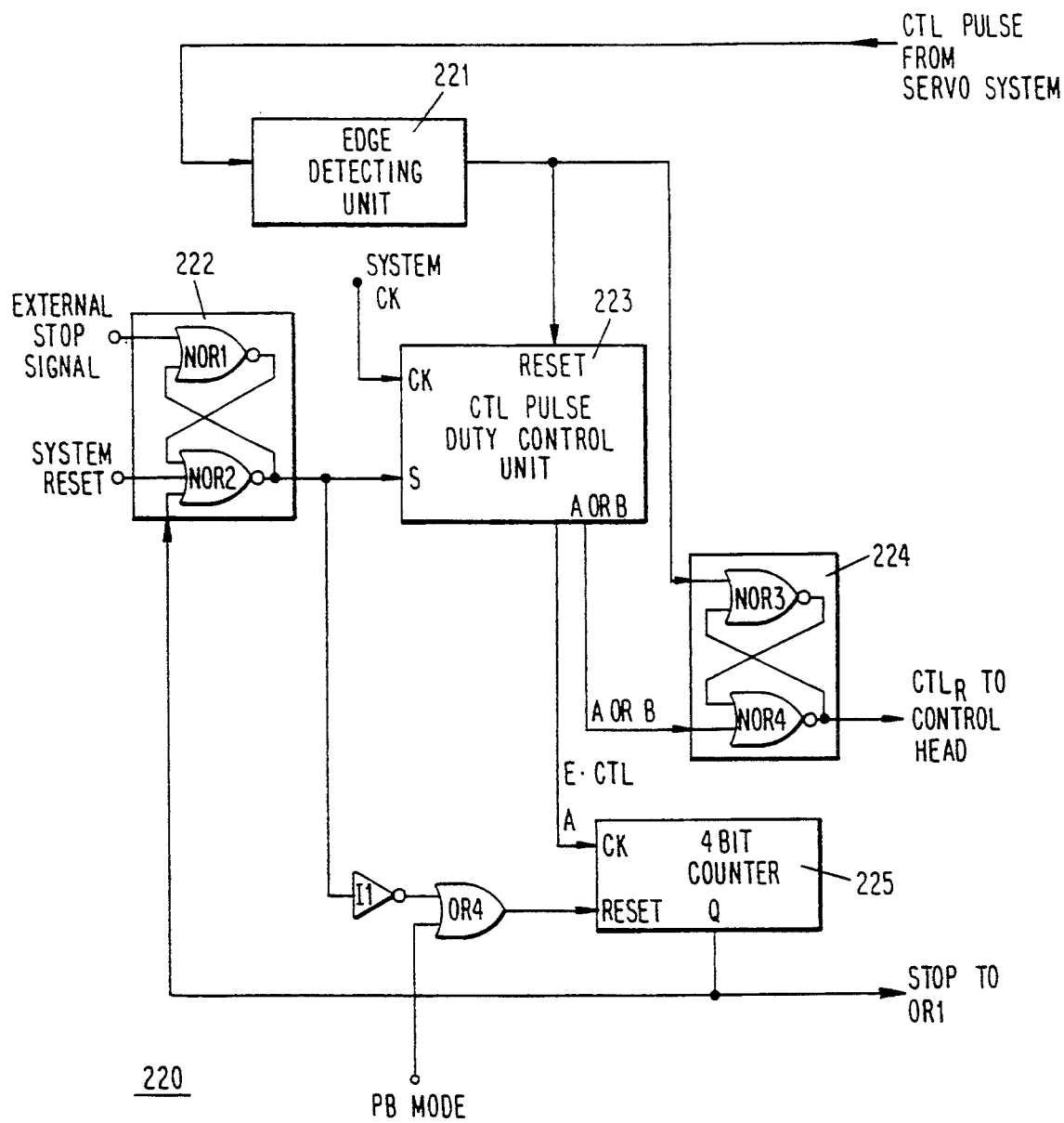
FIG. 3 is a detailed block diagram showing a control pulse recording unit of the circuit of FIG. 2.

The control pulse recording unit 220 includes, as shown in FIG. 3, an edge detector 221 for detecting an edge of a control pulse CTL through a control head and outputting a single pulse, a first latch 222 for latching an external stop signal STOP until a fedback signal of an output signal from the control pulse recording unit 220 and a system reset signal are applied, a control pulse duty controller 223 for receiving the output signal from said first latch 222 as a duty cycle modulating selection signal S, and the edge detecting signal from said edge detector 221 as a reset signal so as to count a system clock signal CK and selectively outputting a count signal B of which a reference duty cycle (55–65%) is counted or a count signal A of which a modulated duty cycle (75–85%) is counted depending upon said selection signals, a second latch 224 for latching the edge detecting signal of said edge detector 221 until the output signal from said control pulse duty controller 223 becomes a high potential signal and outputting the latched signal as a control pulse $CTL_R$ to be recorded on the tape, an OR-gate OR4 for OR-ing the output signal from the first latch 222 through an inverter gate I1 and a reproducing (playback) mode signal PB, and a 4-bit counter 225 for receiving the output signal from said OR-gate OR4 as a reset signal and a duty-modulated output signal A among the output signals of the control pulse duty controller 223 as a clock signal and outputting a stop signal STOP when the clock signal is inputted in a predetermined number.

Figure 4:
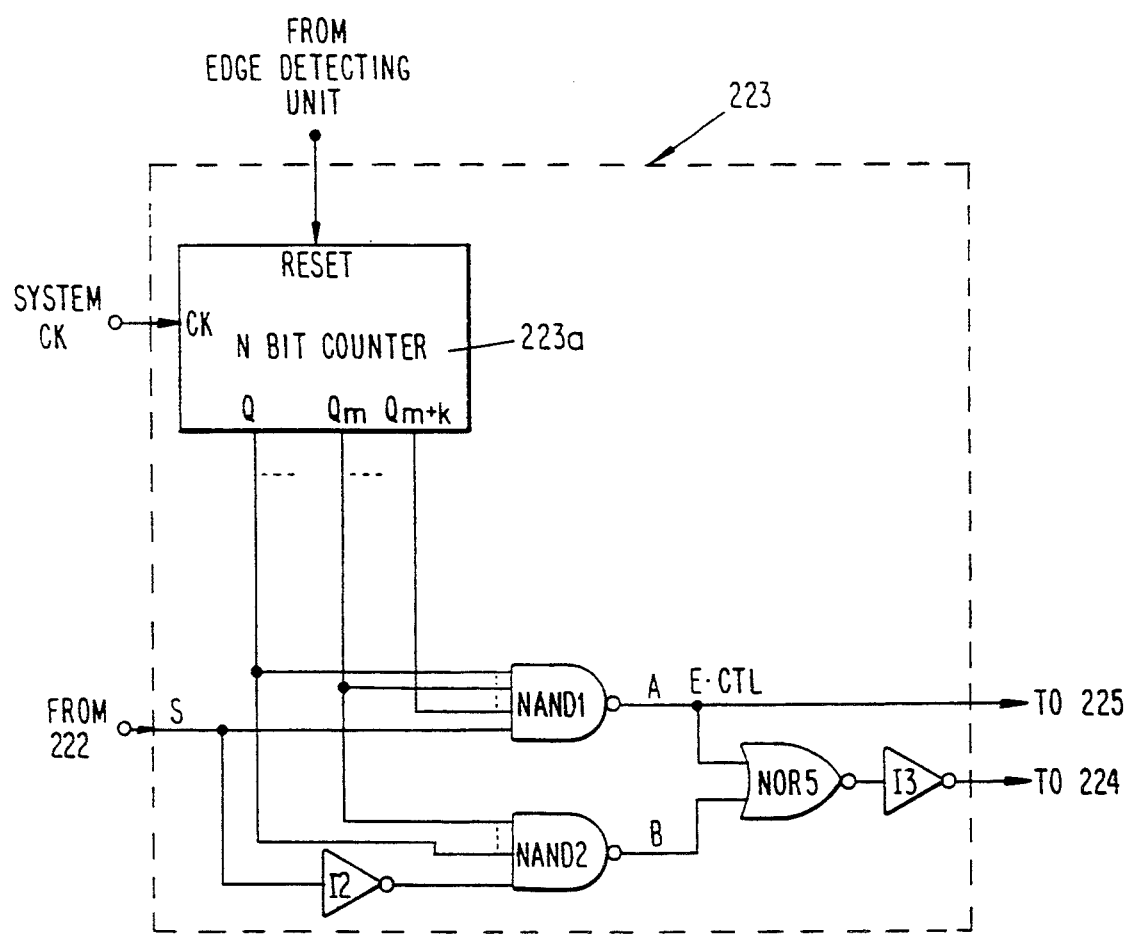
FIG. 4 is a detailed block diagram showing a control pulse duty controller of the control pulse recording unit of FIG. 3.

The control pulse duty controller, as shown in FIG. 4, includes an N-bit counter 223a for receiving the edge detecting signal from the edge detector 221 as a reset signal and counting the system clock signal CK at a period of the control pulse, a first NAND-gate NAND1 for NANDing the selection signal based on the output signal from the first latch and output signals Q1–Qm+k of which the modulation duty cycle is counted among the count values of the N-bit counter 223a and outputting the NANDed signal to the 4-bit counter 225, a second NAND-gate NAND2 for NANDing the output signal from a second inverter gate I2 for inverting the selection signals and output signals Q1–Qm of which the reference duty cycle is counted among the count values of the N-bit counter 223a, and a NOR-gate NOR5 and a third inverter gate I3 for NORing the output signals A and B from the first and second NAND gates NAND1 and NAND2 and inverting and outputting the NORed signal to the second latch 224.

The program end detecting unit 300, as shown in FIG. 2, includes: an end indicating control pulse detecting 31 unit for receiving the consecutive recording signal E.REC of the consecutive recording switch 100 as an enable signal and detecting a program end indicating control pulse E.CTL modulated at a predetermined duty cycle among the control pulses CTLp which are detected in the high speed advance travelling mode, a control pulse detecting unit 320 for receiving the consecutive recording signal E.REC of the consecutive recording switch 100 as an enable signal and detecting presence/absence of the control pulses CTLp which are detected in the high speed advance travelling mode, and a recording signal controller 330 for outputting a recording signal REC for operating the video cassette tape recorder in the recording mode when no control pulse signal is detected at the control pulse detecting unit 320 or a program end indicating control pulse is detected at the end indicating control pulse detecting unit 310 under the condition that the consecutive recording signal E.REC of the consecutive recording switch 100 is applied, or when a normal recording signal S.REC is inputted.

The recording signal control unit, as shown in FIG. 2, includes a first AND-gate AD1 for ANDing the consecutive recording signal E.REC of the consecutive recording switch 100 and the output signal from the control pulse detecting unit 310, a second OR-gate OR2 for ORing the output signal from said first AND-gate AD1 and the output signal from the end indicating control pulse detecting unit 310, a second AND-gate AD2 for ANDing the output signal from said second OR-gate OR2 and the consecutive recording signal E.REC of the consecutive recording switch 100, and a third OR-gate OR3 for ORing the output signal from said second AND-gate AD2 and the normal recording signal S.REC and outputting the ORed signal to an internal circuit of the video cassette type recorder as a recording signal.

Figure 5:
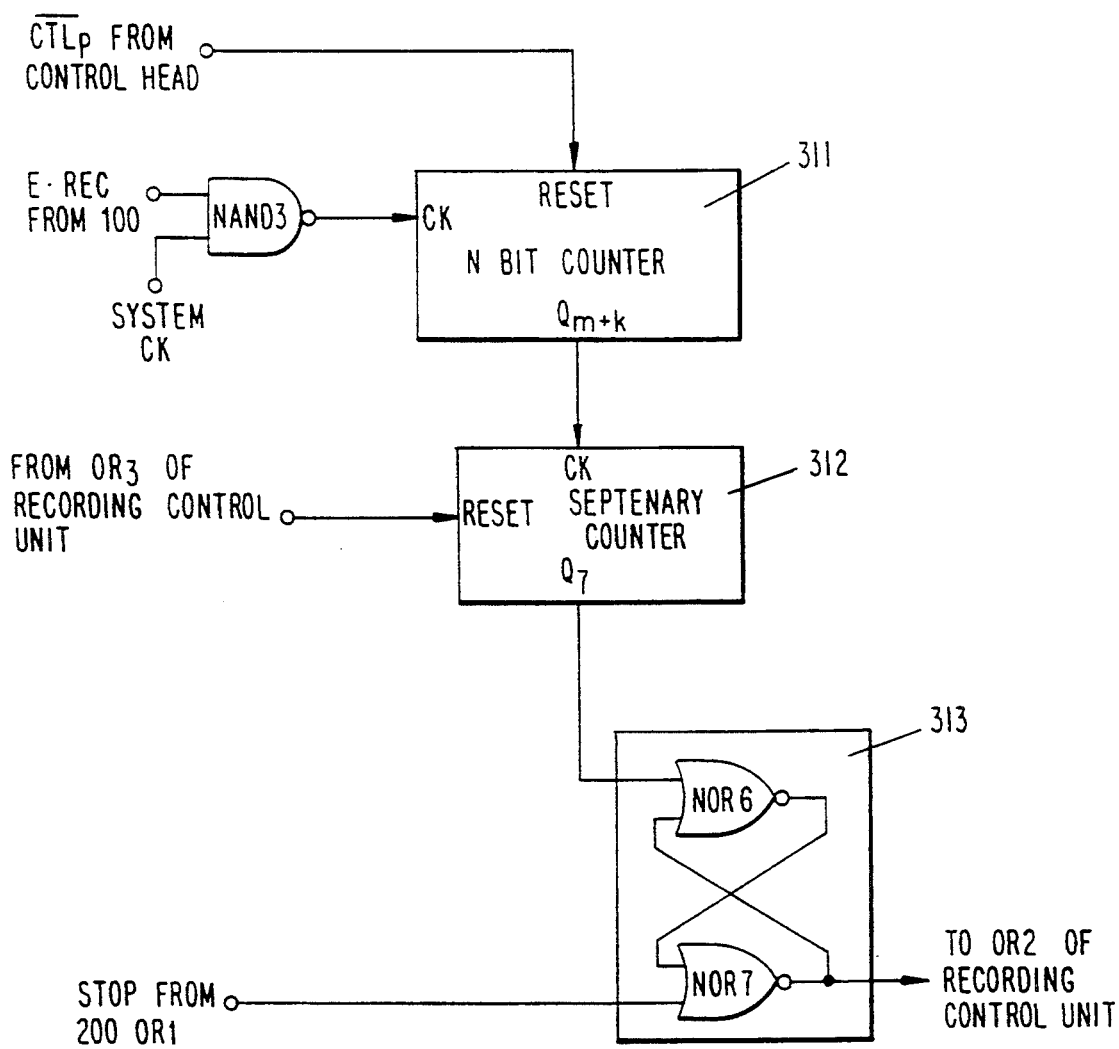
FIG. 5 is a detailed block diagram showing an end indicating control pulse detecting unit of FIG. 2.

The end indicating control pulse detecting unit 310, as shown in FIG. 5, includes a third NAND-gate NAND3 for NANDing the consecutive recording signal E.REC of the consecutive recording switch 100 and the system clock signal CK, a second N-bit counter 311 for receiving the output signal from said third NAND-gate NAND3 as a clock signal CK and an inverting signal CTLp of the control pulse CTLp detected from the tape through a control head as a reset signal RESET and counting a high potential duty cycle of the control pulse CTL, a septenary counter 312 for receiving a predetermined count value of which the duty cycle (75–85%) of the end indicating control pulse E.CTL is counted among the count values Qm+k of said N-bit counter 311 as a clock signal and counting the number of the input clock signals until it is reset by the recording signal REC of the OR-gate OR3 of the recording control unit 330, and a third latch 313 for latching and outputting count signals over a predetermined value Q7 among count values of the septenary counter 312 until a stop signal STOP outputted through the end indicating control pulse recording unit 200 becomes active.

Figure 6:
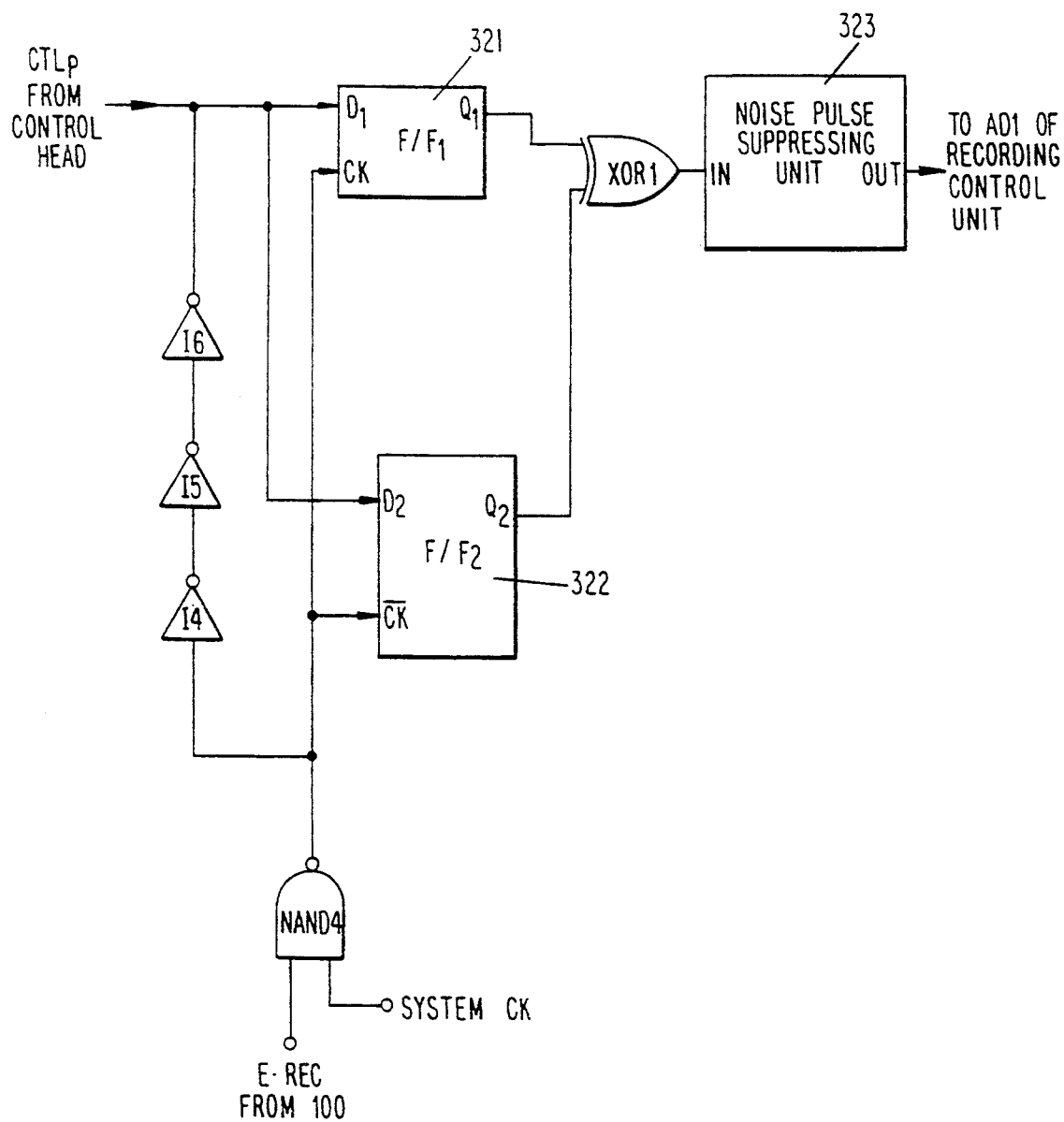
FIG. 6 is detailed block diagram showing a control pulse detecting unit of FIG. 2.

The control pulse detecting unit, as shown in FIG. 6, includes a fourth NAND-gate NAND4 for NANDing the consecutive recording signal E.REC of the consecutive recording switch 100 and the system clock signal CK, fourth to sixth inverter gates I4–I6 for delaying the output signal from said fourth NAND gate NAND4, first and second D-flip-flops 321 and 322 for receiving the output signal from said sixth inverter gate I6 and a control pulse CTLp detected at the control head as a data input D and receiving the output signal from the fourth NAND gate NAND4 as clock signals CK and $\overline{CK}$, respectively, an exclusive OR-gate XOR1 for exculsively ORing the output signals from said D-flip-flops 321 and 322, and a noise suppressing 323 unit for receiving the output signal from said exclusive OR-gate XOR1, removing a noise pulse below a predetermined width therefrom, and outputting a control pulse detecting signal to the AND-gate AND1 of the recording signal control unit 323.

Hereinafter, the operation and effect of the present invention will be described with reference to FIGS. 3 to 5.

When a user presses the consecutive recording switch 100 under the condition that a new program is prepared to be recorded, the main controller executes the steps below consecutively so that a new program is recorded after the previously recorded program.

As shown in FIG. 1, the main controller checks as to whether the consecutive recording switch 100 is turned on so as to discriminate the selection of the consecutive recording mode. When the consecutive recording switch 100 is turned on, the video tape is travelled at a high speed.

Thereafter, a step for discriminating presence/absence of a control pulse CTL, which is detected from the control head during the high speed advance travelling of the tape, is executed. When no control pulse is detected from the video tape, it means that there is no program in the currently scanned portion of the video tape. Thus, the high speed travelling mode is stopped and the VCR is operated in a recording mode so that a new program is recorded in the currently scanned portion of the video tape.

Meanwhile, when a control pulse is detected in the high speed advance travelling mode, it means that a program is recorded in the currently scanned portion of the video tape. Thus, the control pulse detecting step is repeatedly executed until an end indicating control pulse which indicates the end of the previously recorded program is detected.

When an end indicating control pulse is detected in the end indicating control pulse detecting step, the control pulse detecting step and the end indicating control pulse detecting step are repeatedly executed until the number of detecting the pulses becomes a predetermined number. When the detecting number of the end indicating control pulses is over a predetermined number or no control pulse is detected at the control pulse detecting step, a recording mode is executed to record a new program. That is, when a control pulse is not detected before the end indicating control pulse is detected more than a predetermined number, or when the end indicating control pulse is detected more than the predetermined number, it is discriminated that the previously recorded program is ended so that a new program is recorded.

Thereafter, when a stop signal STOP is inputted from a remote controller or a key board during the recording mode, a high potential duty cycle of the control pulse is modulated to record the control pulse as a program end indicating control pulse. The program end indicating control pulse recording step is repeatedly executed until the number of recording of the program end indicating control pulse becomes a predetermined number and then stopping the recording mode.

The circuit for recording and detecting a program end signal of the present invention operates as follows:

When a user presses the consecutive recording switch 100, a consecutive recording signal E.REC is outputted so that the main controller executes a fast-forward travelling mode (faster than a normal play about 200 times). At this moment, the control head detects a control pulse CTLp from the video tape which is travelling in the fast-forward mode.

Generally, when a program is recorded on the tape, a control pulse is recorded on the tape for controlling a head switching timing and automatic tracking. The control pulse is generated at a servo system and recorded on and detected from the tape by a control head. In the present invention, the control pulse which is generated at the servo system is outputted to a control head through a control pulse recording unit 110.

Accordingly, the control head detects a control pulse recorded on the video tape during the high speed advance travelling mode, i.e., the fast-forward mode of the tape, and the detected control pulse CTLp is applied to the program end detecting unit 300.

The program end detecting unit 320 detects the presence/absence of the control pulse in accordance with the following procedures.

That is, since the consecutive recording signal E.REC of the consecutive recording switch 100 is NANDed with the system clock signal CK at the NAND-gate NAND4, the system clock signal CK is applied to the D-flip-flops 321 and 322 as clock signals CK and $\overline{CK}$ only when the consecutive recording signal E.REC is high potential so that a detecting operation for presence/absense of the control pulse CTLp which is detected at the control head is initiated.

Thereafter the system clock signal CK which is outputted from the NAND-gate NAND4 is delayed for a predetermined time by the inverter gates I4–I6 and then applied to a data input terminals D1 and D2 of the D-flip-flops 321 and 322 together with the control pulse CTLp which is inputted from the control head, when the control pulse CTLp which is read by the control head from the tape which is travelled in the fast-forward mode is inputted, the system clock signal CK which is outputted through the inverter gate I6 is disregarded and only the control pulse CTLp is applied to the data input terminals D1 and D2 of the D-flip-flops 321 and 322.

When the output signal of the inventer gate I6 is low potential, the output terminal of the inverter gate I6 is caused to be in high impedance state so that a high potential signal among the control pulses CTLp is applied to the data input terminals D1 and D2 of the D-flip-flops 321 and 322. While in case that the control pulse CTLp is not applied, the control pulse input terminal is caused to be in high impedance state. Also, when the high potential signal of the inverter gate I6 is bipassed through the control pulse input terminal under the condition that a low potential control pulse signal CTLp is inputted to the control pulse input terminal, the output signal of the inverter gate I6 is disregarded by virtue of the control pulse CTLp in case that the control pulse CTLp is present so that only the control pulse CTLp is applied as an effective signal while in case that the control pulse CTLp is absent, the output signal of the inverter gate I6 is applied as an effective signal.

Accordingly, in case that the control pulse CTLp is not applied, the system clock signal CK is applied after being delayed for a predetermined time and inverted to the data input terminals D1 and D2 of the D-flip-flops 321 and 322. Since the D-flip-flops 321 and 322 are synchronized with a rising edge and a falling edge of the system clock signal CK, the two D-flop-flops 321 and 322 output different output signals from each other. That is, at the rising edge of the system clock signal CK where the D-flip-flop 321 operates, a low potential signal which is just prior to the rising edge is delayed and applied to the data input terminal D1 of the D-flip-flop 321, so that the D-flip-flop 321 always outputs a low potential signal. On the other hand, at the falling edge of the system clock signal CK where the D-flip-flop 322 operates, a high potential signal just prior to the falling edge is delayed and applied to the data input terminal D2 of the D-flip-flop 322, so that the D-flip-flop 322 always outputs a high potential signal.

When the control pulse CTLp is not inputted as above, since the output levels of the two D-flip-flops 321 and 322 are different from each other, a high potential signal is outputted from the exclusive OR-gate XOR1. The high potential output signal from the exclusive OR-gate XOR1 is outputted as a high potential signal through the noise suppressing unit 323 which indicates that a control pulse CTLp is not detected.

In case that a control pulse CTLp is inputted from the control head, the system clock signal CK which is outputted from the inverter gate I6 is disregarded and only the control pulse CTLp is applied to the data input terminal D1 and D2 of the D-flip-flops 321 and 322. As a result, the output signals of the D-flip-flops 321 and 322, which are synchronized, respectively, at the rising edge and the falling edge of the clock signal CK, are different in their levels as much as a half period of the system clock signal CK while they are outputted in the same level for the remaining half period.

That is, after the control pulse CTLp is applied in a high potential signal, the output signal of the D-flip-flop 321 is outputted in a high potential signal at the rising edge of the system clock signal CK and then the output signal of the D-flip-flop 322 is outputted in a high potential signal at the falling edge of the system clock signal CK. Generally, the period of the system clock signal CK is shorter than that of the control pulse CTLp about tens to hundreds times.

Consecutively, the exclusive OR-gate XOR1 outputs a high potential signal during the time period the output signal of the D-flip-flops 321 and 322 are different from each other among one period of the control pulse while outputs a low potential signal during the remaining time period. When a low potential signal containing a high potential pulse is outputted from the exclusive OR-gate XOR1, the noise pulse suppressing unit 323 removes the high pulse corresponding to the half period of the system clock signal CK and outputs a continuous low potential signal as a control pulse detecting signal. The noise suppressing unit 323 also integrates the output signal of the exclusive OR-gate XOR1 which contains a high potential pulse which is far shorter than the low potential time and compares the integrated value with a predetermined value and then outputting a low potential signal from which a noise pulse is removed.

As described, when the consecutive recording switch 100 is pressed, the VCR is operated in the fast-farward mode. Thereafter, when a control pulse is detected as a program is recorded in the video tape, a low potential signal is outputted from the control pulse detecting unit 320 while in case that a control pulse is not detected as the tape is a non-used one or there is no program at the currently scanned portion of the tape, a high potential signal is outputted from the control pulse detecting unit 320.

When a high potential signal is outputted as a control pulse is not detected at the control pulse detecting unit 320, a high potential signal is outputted from the AND-gate AD1 of the recording signal control unit 330 and the high potential signal from the AND-gate AD1 is outputted through the OR-gate OR2, the AND-gate AD2 and the OR-gate OR3 to the internal circuit of the VCR as a recording signal. That is, when a control pulse CTLp is not detected from the video tape after the consecutive recording mode is selected, a recording signal REC is outputted so that the VCR is operated immediately in the recording mode.

On the other hand, when any program is recorded in the video tape, a low potential signal responsive to the detected control pulse CTLp is outputted from the control pulse detecting unit 320. As a result, a low potential signal is outputted from the AND-gate AD1 of the recording control unit 330 and the output signal from the AND-gate AD1 and the output signal from the end indicating control pulse detecting unit 310 are ORed at the OR-gate OR2 so that the output level of the OR-gate OR2 is determined by the output signal from the end indicating control pulse detecting unit 310.

Meanwhile, the end indicating control pulse detecting unit 310 receives the output signal from the consecutive recording switch 100 as an enable signal and detects an end indicating control pulse E.CTL of which the duty cycle is modulated among the control pulses CTLp. The end indicating control pulse detecting unit 310, as shown in FIG. 5, starts to detect the end indicating control pulse E.CTL after the consecutive recording switch 100 is applied to the NAND-gate NAND3 in a high potential signal and the system clock signal CK is outputted as a clock signal of the N-bit counter 311.

Figure 7:
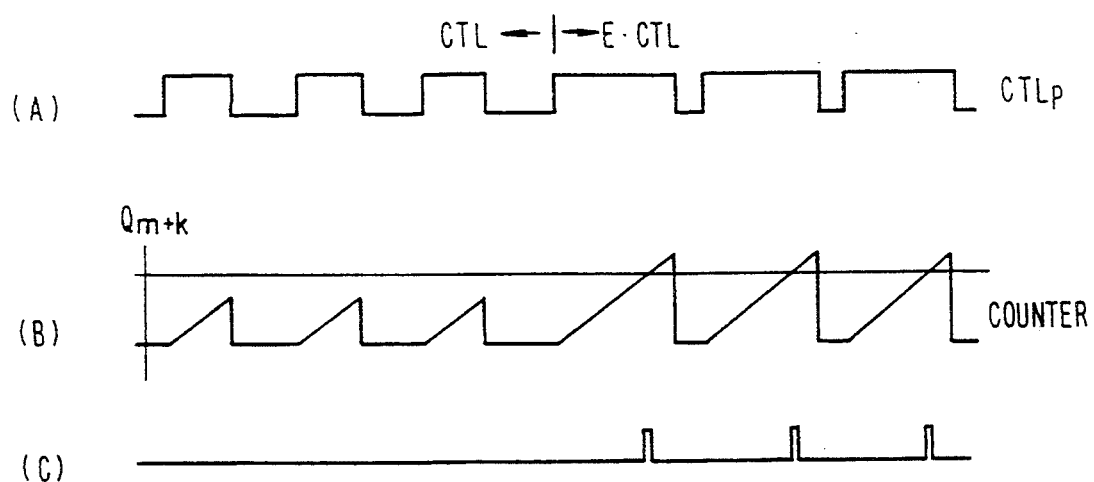
FIG. 7 shows waveform views of the control pulse for indicating an end of program of FIG. 5.

Thereafter, when a clock signal is inputted in the N-bit counter 311, an inverted control pulse $\overline{CTLp}$ is applied to the N-bit counter 311 as a reset signal RESET, as shown in FIG. 7A, so that the N-bit counter 311 counts the high potential time of the control pulse CTLp.

For example, when a control pulse having the reference duty cycle (55%–65%), as shown in the front-half of the waveform of FIG. 7A, is applied to the N-bit counter 311 as a reset signal, the N-bit counter 311 is reset before a predetermined count value Qm+k, as shown in the front-half of the waveform of FIG. 7B, is generated. While in case that an end indicating control pulse E.CTL having a modulated duty cycle (75–85%), as shown in the rear-half of the waveform of FIG. 7A, is applied to the N-bit counter 311 as a reset signal, the N-bit counter 311 counts a value over the predetermined count value Qm+k, as shown in the rear-half of the waveform of FIG. 7B. As a result, the output signal Qm+k of the N-bit counter 311 is outputted as one pulse at every time one end indicating control pulse E.CTL having modulated duty cycle (75–85%) is applied, as shown in FIG. 7C.

When the N-bit counter 311 detects the end indicating control pulse E.CTL and outputs a pulse signal, the septenary counter 312 counts the number of pulses. The septenary counter 312 is adapted to prevent an error occurred by a noise and, if ten control pulses E.CTL of which the duty cycle is modulated are recorded, outputs a high potential signal which indicates that the end indicating control pulse is detected when about seven end indicating control pulses E.CTL are detected. Thereafter, the latch 313 latches the high potential signal until a stop signal STOP is applied and outputs the latched signal.

The latch 313 includes NOR-gates NOR6 and NOR7 and is a R,S-flip-flop. When the output signal of the septenary counter 312 in a high potential signal under the state that an internal stop signal STOP which is outputted from the program end recording unit 200 is low potential, the output signal from the NOR-gate NOR7 is low potential and the output signal from the NOR-gate NOR7, the output signal of the NOR-gate NOR6 becomes low potential so that all the input signal of the NOR-gate NOR7, the output signal from the NOR-gate NOR6 and the stop signal STOP become low potential. Accordingly, the output signal from the NOR-gate NOR7 becomes high potential. That is, as the output signal from the septenary counter 312 becomes high potential, a high potential signal which indicates that an end indicating control pulse E.CTL is detected is outputted from the latch 313.

At this moment, though the output signal from the septenary counter 312 becomes low potential, the output signal from the NOR-gate NOR6 is maintained at low potential because one input terminal of the NOR-gate NOR6 is fedback. As a result, the output signal from the NOR-gate NOR7 is continuously maintained at high potential.

Thereafter, when the stop signal STOP is applied in a high potential signal, the septenary counter 312 is reset and the high potential signal that is latched at the latch 313 is cleared so that the output signal from the latch 313 becomes low potential.

As a result, high potential signal is outputted from the end indicating control pulse detecting unit 310 so that a high potential signal is outputted from the OR-gate OR2 of the recording control unit 330. At this moment, a low potential signal is inputted to one input terminal of the OR-gate OR2 of the recording control unit 330 since the output signal from the control pulse detecting unit 320 is maintained at low potential by the detection of the control pulse.

Consecutively, when a high potential signal is inputted to the AND-gate AD2 from the OR-gate OR2 of the recording control unit 330, the AND-gate AD2 outputs a high potential signal as a recording signal REC for operating the VCR in the recording mode since a high potential signal is applied to the other side input terminal of the AND-gate AD2 by the consecutive recording switch 100.

Accordingly, when a user operates the VCR in the consecutive recording mode by pressing the consecutive recording switch 100, the VCR is immediately operated in the recording mode in case that no control pulse is detected because of inexistence of a program on the tape. While in case that any program is recorded on the tape, the VCR is operated in the recording mode when a control pulse is not detected because the program portion has passed over or after the program end indicating control pulse of which the duty cycle is modulated is detected. That is, when a program is recorded in the currently scanned portion of the tape, a new program is recorded in the portion that the previously recorded program is ended.

Thereafter, when a user presses a stop key through a key board or a remote controller in order to end or stop the program recording operation, a high potential stop signal STOP is inputted to the program end recording unit 200.

At this moment, when an external stop signal STOP is inputted to the selecting unit 210 of the program end recording unit 200, a high potential stop signal STOP is outputted to the control pulse recording unit 220 in case that the consecutive recording switch 100 is in a turn-on state, while in case the consecutive recording switch 100 is in a turn-off state a high potential stop signal STOP is outputted to the OR-gate OR1.

Figure 8:
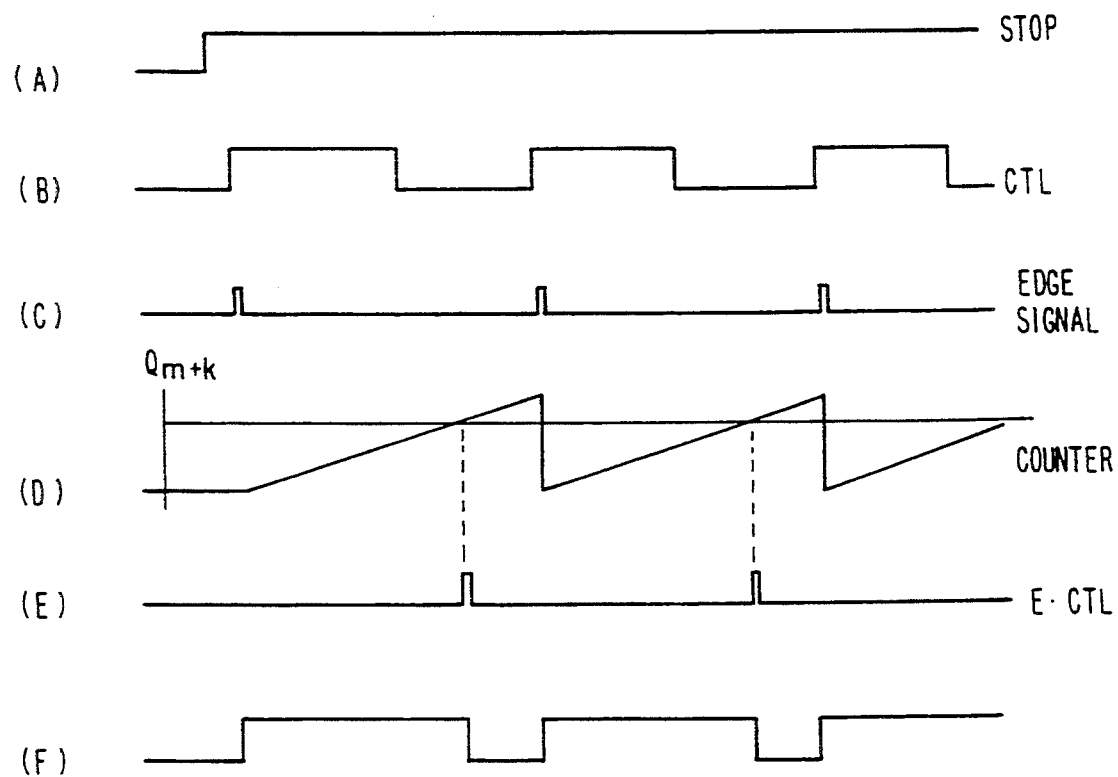
FIG. 8 shows waveform views of the control pulse for indicating an end of program of FIG. 3.

The control pulse recording unit 220 outputs one pulse signal at every time the control pulse is inputted in response to the edge detection at the edge detector 221, as shown in FIG. 8C, when a control pulse CTL, as shown in FIG. 8B, is applied to the edge detector 221 from a servo system (not shown). The edge detection signal of the edge detector 221 is applied to the control pulse duty controller 223 as a reset signal and also applied to the second latch 224.

The N-bit counter 223a of the control pulse duty control unit 223 counts the system clock signal CK which is inputted for a time between the edges which are detected at the edge detecting unit 221, as shown in FIG. 8D.

At this moment, the output signal of the first latch 222 is outputted in low potential or high potential in response to the external stop signal STOP and applied to the control pulse duty control unit 223 as an output selection signal S. And then, it is determined as to whether the high potential duty of the control pulse is adopted as a reference duty cycle or as a modulated duty cycle based on the output selection signal S. That is, when the stop signal STOP is not applied, the high potential duty cycle is selected to be 55–65% while in case the external stop signal STOP is applied, the high potential duty cycle of the control pulse is selected to be 75%–85% by respective count values.

When the external stop signal STOP is not applied, a low potential signal is outputted from the first latch 222 and a low potential signal is inputted to the NAND-gate NAND1 of the control pulse duty control unit 223, so that the NAND-gate NAND1 outputs a low potential signal irrespective of the output signal from the N-bit counter 223a. In contrast, since the output signal from the first latch 222 is inverted at the inverter gate I1 and inputted to the NAND-gate NAND2 in a high potential signal, the output level of the NAND-gate NAND2 is determined on the basis of the output signal from the N-bit counter 223a.

Thereafter, the count value of the system clock signal CK is increased so that the signals Q1–Qm become high potential and at this moment a high potential pulse signal is outputted through the NAND-gate NAND2. The high potential pulse signal from the NAND-gate NAND2 is inverted at the NOR-gate NOR5 and inverted again through the inverter gate I3 and then applied in a high potential pulse signal to the second latch 224 as an input signal and to the 4-bit counter 225 as a clock signal.

That is, all the signals Q1–Qm become a high potential signal at the time point that the N-bit counter 223a counts an edge of the control pulse and the count value comes to the reference duty cycle (55%–65%). As a result, the output signal from the NAND-gate NAND2 becomes high potential and applied to the second latch 225 through the NOR-gate NOR5 and the inverter gate I3.

Thereafter, the latch 224 latches the edge detecting signal and outputs a high potential signal before a high potential signal is outputted from the control pulse duty control unit 223. When a high potential signal is outputted from the control pulse duty control unit 223, the latch 224 outputs a low potential signal until the next edge pulse is applied. That is, the second latch 224 outputs the control pulse CTLp, whose high potential time is controlled by the control pulse duty control unit 223, to the control head and records the control pulse CTLp on the video tape.

Accordingly, in case that an external stop signal is not inputted, the first latch 222 outputs a low potential signal and the reference duty cycle (55–65%) time is counted by the control pulse duty control unit 223 whose output is controlled by the low potential signal from the first latch 222 and thereafter a high potential signal is outputted to the second latch 224. As a result, the second latch 224 counts the reference duty cycle (55%-65%) in response to the edge detecting signal and outputs a low potential signal when a high potential signal is inputted from the inverter gate I3. That is, a control pulse CTLp of which the high potential duty cycle is the reference duty cycle (55%-65%) is outputted to the control head so as to be recorded on the tape.

That is, a reference control pulse based on the reference duty cycle may be recorded on the tape during the recording mode executed by the control pulse recording unit 220.

Thereafter, when the external stop signal STOP is inputted, a high potential signal is outputted from the first latch 22 and by the high potential signal, a low potential signal is always outputted from the NAND-gate NAND2. And, the N-bit counter 223a of the control pulse duty control unit 223 counts the high potential time of the control pulse CTLp, as shown in FIG. 8D and when the count value comes to the value Qm+k which corresponds to the modulated duty cycle (75%-85%), the NAND-gate NAND1 outputs a pulse signal, as shown in FIG. 8E, to the 4-bit counter 225 as a clock signal and also to the second latch 224 through the NOR-gate NOR5 and the inverter gate I3.

As a result, the second latch 224 outputs a control pulse of which the high potential duty cycle is 75%-85%, as shown in FIG. 8F, to the control head after the stop signal STOP is inputted, and the 4-bit counter 225 counts the number of pulses which are outputted from the control pulse duty control unit 223 and outputs a high potential stop signal STOP to the main controller when the number of pulses comes to a predetermined number (for example, 10). At this moment, the output signal from the 4-bit counter 225 is fedback to the first latch 222 so that the 4-bit counter 225 outputs a low potential signal. The low potential output signal from the first latch 222 is inverted into a high potential signal through the inverter gate I1 and then applied to the 4-bit counter 225 as a reset signal through the OR-gate OR4.

Accordingly, when an external stop signal STOP is inputted during the recording mode, a control pulse of which the high potential duty cycle is 75%-85% is outputted to the control head for indicating an end of program on the tape, and when the number of the program end indicating control pulse signal comes to ten (10), the stop signal STOP is inputted to the internal circuit in order to stop the recording mode.

Accordingly, when it is intended to record a new program in the video tape in which any program has previously been recorded, especially in case of recording the new program immediately after the previously recorded program, a user may operate the VCR in the consecutive recording mode by pressing the consecutive recording switch 100. In such a consecutive recording mode, the end of the previous program is detected and a new program is recorded just after the previous program and then a predetermined number of control pulses of which the duty cycle is modulated are recorded at the end portion of the newly recorded program, and then the consecutive recording operation is finished.

As described above in detail, the present invention provides the effects that the end of the previously recorded program is automatically detected and a new program is recorded just after the previous program. Also, since the recording position may be searched for in the fast-forward mode, the searching operation may be carried out promptly.

The invention being thus described, it will be obvious that the same may be varied in many ways. Such variations are not to be regarded as a departure from the spirit and scope of the invention, and all such modifications as would be obvious to one skilled in the art are intended to be included in the scope of the following claims.

What is claimed is:

1. A circuit for recording a program end signal for use in a video cassette tape recorder, comprises:
   a consecutive recording switch for outputting a signal selecting a consecutive recording mode for searching for an end portion of a program which has been previously recorded on a tape and consecutively recording a program;
   a program end recording means for outputting a control pulse to be recorded at a reference duty cycle which is generated from a servo system, modulating the control pulse at a predetermined duty cycle when a stop signal is inputted, delaying the stop signal and outputting a predetermined number of control pulses for indicating an end of program, and thereafter outputting said stop signal; and
   a program end detecting means for outputting a recording signal for operating the video cassette tape recorder in a recording mode when no control pulse is detected from the tape or after the program end indicating pulse is detected upon selection of the consecutive recording mode by the consecutive recording switch, wherein
   said program end detecting means includes
   an end indicating control pulse detecting means for receiving the signal from the consecutive recording switch as an enable signal and detecting a program end indicating control pulse modulated at a predetermined duty cycle among control pulses which are detected in a high speed advance travelling mode,
   a control pulse detecting means for receiving signal from the consecutive recording switch as an enable signal and detecting presence/absence of program end indicating control pulses which are detected in the high speed advance travelling mode, and
   a recording signal controller means for outputting a recording signal for operating the video cassette tape recorder in the recording mode when one of no program end indicating control pulse signal is detected at the control pulse detecting mean and a program end indicating control pulse is detected at the end indicating control pulse detecting means under the condition that one of the signals from the consecutive recording switch and a normal recording signal is inputted; and
   said end indicating control pulse detecting means includes
   a NAND-gate for NANDing the signal from the consecutive recording switch and a system clock signal,
   an N-bit counter for receiving an output signal from said AND-gate as a first clock signal and an inverted program end indicating control pulse detected from the tape through a control head as a reset signal and counting a high potential duty cycle of the inverted program end indicating control pulse, a septenary counter for receiving a predetermined count value of which the duty cycle of the inverted program end indicating control pulse is counted as a second clock signal and counting the number of second clock signals until being reset by the recording signal from the recording recording signal/controller means, and a latch for latching and outputting count signals of the septenary counter which are over the predetermined value until said stop signal is outputted from the program end recording means.

* * * * *